United States Patent [19]
Burch

[11] Patent Number: 5,239,361
[45] Date of Patent: Aug. 24, 1993

[54] DYNAMIC MIRROR ALIGNMENT DEVICE FOR THE INTERFEROMETER OF AN INFRARED SPECTROMETER

[75] Inventor: Robert V. Burch, Madison, Wis.

[73] Assignee: Nicolet Instrument Corporation, Madison, Wis.

[21] Appl. No.: 782,611

[22] Filed: Oct. 25, 1991

[51] Int. Cl.⁵ .................... G01B 9/02; G01N 21/35; G02B 26/10
[52] U.S. Cl. .................................... 356/345; 356/346; 359/876
[58] Field of Search .................. 356/345, 346; 359/876

[56] References Cited

U.S. PATENT DOCUMENTS

| | | |
|---|---|---|
| 3,577,791 | 5/1971 | Vanden Broek . |
| 3,729,261 | 4/1973 | Sandercock . |
| 3,856,382 | 12/1974 | Midland Capital Corp. . |
| 3,879,112 | 4/1975 | Hickey . |
| 4,053,231 | 10/1977 | Fletcher et al. . |
| 4,060,315 | 11/1977 | Heinz ............................. 248/487 X |
| 4,100,576 | 7/1978 | Ditthardt ........................ 358/128 |
| 4,175,832 | 11/1979 | Umeki et al. .................. 358/128 X |
| 4,203,654 | 5/1980 | Ellis . |
| 4,376,572 | 3/1983 | Gijzen ............................ 369/44 X |
| 4,480,914 | 11/1984 | Thompson et al. ........... 356/352 X |
| 4,506,204 | 3/1985 | Galburt ........................... 318/653 |
| 4,507,597 | 3/1985 | Trost ............................... 318/653 |
| 4,613,203 | 9/1986 | Proetel et al. . |
| 4,660,941 | 4/1987 | Hattori et al. . |
| 4,664,487 | 5/1987 | Tam . |
| 4,738,500 | 4/1988 | Grupp et al. . |
| 4,744,071 | 5/1988 | Bricot et al. .................. 369/44 |
| 4,799,001 | 1/1989 | Burch ............................. 318/640 |
| 4,847,878 | 7/1989 | Badeau .......................... 377/19 |

FOREIGN PATENT DOCUMENTS

| | | |
|---|---|---|
| 901075 | 3/1985 | Belgium . |
| 389115 | 9/1990 | European Pat. Off. . |

OTHER PUBLICATIONS

News Release, BEI Motion Systems Company, Feb. 7, 1986, "New Subminiature Linear Moving Coil Actuator can be used for Laser Lens and Mirror Positioning and other Precise Positioning Applications".

B. J. Hogan, "Reactionless Beamsteering Mirror May Aim Laserts for SDI," Design News, Sep. 8, 1986, pp. 104–108.

*Primary Examiner*—Vincent P. McGraw
*Attorney, Agent, or Firm*—Foley & Lardner

[57] ABSTRACT

An interferometer mirror such as may be used in an FTIR spectrometer is mounted to a mirror alignment device which allows alignment of the mirror during operation of the interferometer. The alignment device includes a base, a mirror support to which the mirror is mounted, and means for mounting the mirror support to the base to allow resilient pivoting of the mirror about an initial position around two orthogonal axes when force is applied to the mirror support. Two drive coils of square configuration are mounted around the periphery of the mirror support. Each drive coil has lower coil sections along two opposite quadrants and higher coil sections, with the two drive coils being mounted to the mirror supports so that the lower sections of each are in adjacent quadrants. A magnetic field, such as that provided by permanent magnets, is applied to the lower sections of each coil while the upper sections of each coil are outside the magnetic field. When current is supplied in one direction to a drive coil, the current interacts with the magnetic field passing through the lower sections of the coil to tilt the mirror support about one axis of rotation in one direction, whereas current supplied to the coil in the opposite direction will tilt the magnet support in the opposite direction about the axis. In this manner, current can be supplied to the two coils as necessary to hold the mirror support and thus the mirror attached to it in a desired orientation.

20 Claims, 4 Drawing Sheets

DYNAMIC MIRROR ALIGNMENT DEVICE FOR THE INTERFEROMETER OF AN INFRARED SPECTROMETER

FIELD OF THE INVENTION

This invention relates generally to the field of optical systems and particularly to the optics used in the interferometers of Fourier transform infrared spectrometers.

BACKGROUND OF THE INVENTION

Fourier transform infrared (FTIR) spectrometers are utilized in the analysis of chemical compounds. In these instruments, a beam of infrared radiation having a band of infrared wavelengths is passed into an interferometer, typically a Michelson interferometer, and is modulated before being passed through the compound to be analyzed and then to a detector. The interferometer modulates the radiation received by it to provide an output beam in which a narrow range of infrared wavelengths is typically reduced or enhanced in intensity, with the affected range of wavelengths changing periodically over time. The time correlated output data from the detector is analyzed by Fourier transformation to derive information on the characteristics of the sample through which the beam was passed.

In the typical Michelson interferometer used in such FTIR spectrometers, the input beam is received by a beam splitter which partially passes the beam through to a moving mirror and partially reflects the beam to a fixed mirror, or vice versa, and the reflected beams are recombined at the beam splitter to yield the output beam. The relative position of the moving mirror with respect to the beam splitter and fixed mirror will determine which wavelengths constructively and destructively interfere when the beams from the two mirrors are recombined at the beam splitter. The movement of the moving mirror toward and away from the beam splitter results in the scanning of the constructively and destructively interfering wave lengths across a desired band of infrared wave lengths. Examples of such Michelson interferometer systems in FTIR instruments are shown in U.S. Pat. Nos. 4,799,001 and 4,847,878.

It is critical in the design of FTIR instruments that the surfaces of the fixed mirror and the moving mirror be accurately held orthogonal to each other. Mirror position accuracy is crucial because deviations in the mirror alignment produce small errors in the time domain interferogram which may translate into large errors in the frequency domain spectrum. In a typical interferometer, mirror deviations larger than one wavelength of the received radiation beam are considered significant and can seriously degrade the quality of the instrument.

Static alignment of the mirrors of the interferometer is typically accomplished by means of differential screws at the back of the mirror which are manually adjusted to align the mirror to a desired position as perfectly as possible. This is a time consuming procedure requiring skill and experience, and adds to manufacturing expense and to field service costs because realignment in the field is often required.

Efforts have been made to eliminate the need to manually align the interferometer mirrors. Automatic static alignment at least relieves the user from performing time consuming realignments. For example, stepper motors have been used to carry out automatically the manual alignment procedure described above. Such devices typically use a digital computer which aids in the alignment of the static mirror at periodic service intervals. A disadvantage of this approach is the slow speed, large size, high cost, and high precision bearings required for the alignment mechanism. To attempt to adjust the moving or fixed mirror dynamically to compensate for the tilting of the moving mirror as it moves on its bearing requires more speed that can be readily obtained with a mechanism using lead screws and stepper motors. Another approach has been to use piezoelectric positioners to align dynamically the tilt of the mirrors. Such positioners are also typically large and expensive, and require high voltage (e.g., 1000 volts) drive levels. The power supplies required for such high voltages also create undesirable operating hazards as well as being relatively expensive.

SUMMARY OF THE INVENTION

In accordance with the present invention, an interferometer mirror such as the fixed mirror of a Michelson interferometer in an FTIR spectrometer is mounted so that it can be tilted about two orthogonal axes. Magnetic positioning means are provided between the mirror support which holds the mirror and a base to drive the tilting of the mirror about one or both of the axes utilizing a control current pass through coils in the magnetic control units. By allowing such control over the tilt of the mirror in a relatively rapid and responsive manner, the mirror can be aligned dynamically when the interferometer is in operation to maintain alignment despite shifts in the position of the moving mirror as it translates back and forth on its bearing. The present invention provides a light-weight, inexpensive and rapidly responsive mirror adjustment system which allows accurate adjustment of mirror position at the speed required to dynamically align it during such operation.

The dynamic mirror alignment device of the present invention includes a base, a mirror support of nonmagnetic material to which the mirror is mounted, or in appropriate circumstances, the mirror itself where it acts as its own support, and means for mounting the mirror support to the base to allow pivoting of the mirror about an initial position when force is applied to the mirror support. The mounting preferably includes a pivot mount comprising a bearing ball which is received in a central pivot pocket on the backside of the mirror support so that the mirror mount can pivot about two orthogonal axes. Preferably, springs or other resilient means are provided between the base and the mirror support at peripheral positions spaced away from the central pivot mount to urge the mirror support back to a normal position.

Two drive coils are mounted around the periphery of the preferably square or rectangular mirror support. Each drive coil has straight coil sections along two opposite quadrants which are at a lower position, and thus closer to the base, and coil sections along the opposite quadrants which are at a higher position. The two drive coils are mounted so that the lower sections of each occupy adjacent quadrants. Means are provided on the base for applying a magnetic field to the lower sections of each of the drive coils to intersect and pass through the coils, preferably substantially parallel to the axes about which the mirror support is mounted for tilting. The means for providing the magnetic field can comprise permanent magnets mounted to the base which have a slot formed therein into which the lower sections of the drive coils fit, with the poles of the permanent magnets being arranged such that the lines of magnetic flux pass across the slots in the permanent magnets.

By applying a current through one of the drive coils in one direction of current flow, the mirror support and the mirror attached to it will be tilted about one axis in relation to the current through the coil. Reversing the current flow through that coil changes the direction of tilt. Similarly, a current can be applied to the other drive coil to tilt the mirror about the other axis.

Preferably, damping means are provided to damp the motion of the mirror about its axes to minimize overshoot and vibration. Such damping can be implemented in the preferred construction of the device by providing a damping fluid in the slots of the magnets through which the lower coil sections move as the mirror support is tilted. Preferably, the fluid filling the slots is a ferromagnetic fluid which will serve to further concentrate the lines of magnetic flux within the slots. Other types of damping mechanisms may also be utilized.

The resilient spring return mechanisms may be implemented utilizing coil springs which are mounted between the base and the mirror support with adjustment screws allowing the initial compression of the springs to be adjusted. In this manner, an initial manual alignment of the starting position of the mirror support can be accomplished.

Further objects, features and advantages of the invention will be apparent from the following detailed description when taken in conjunction with the accompanying drawings.

DETAILED DESCRIPTION OF THE INVENTION

Figure 1:
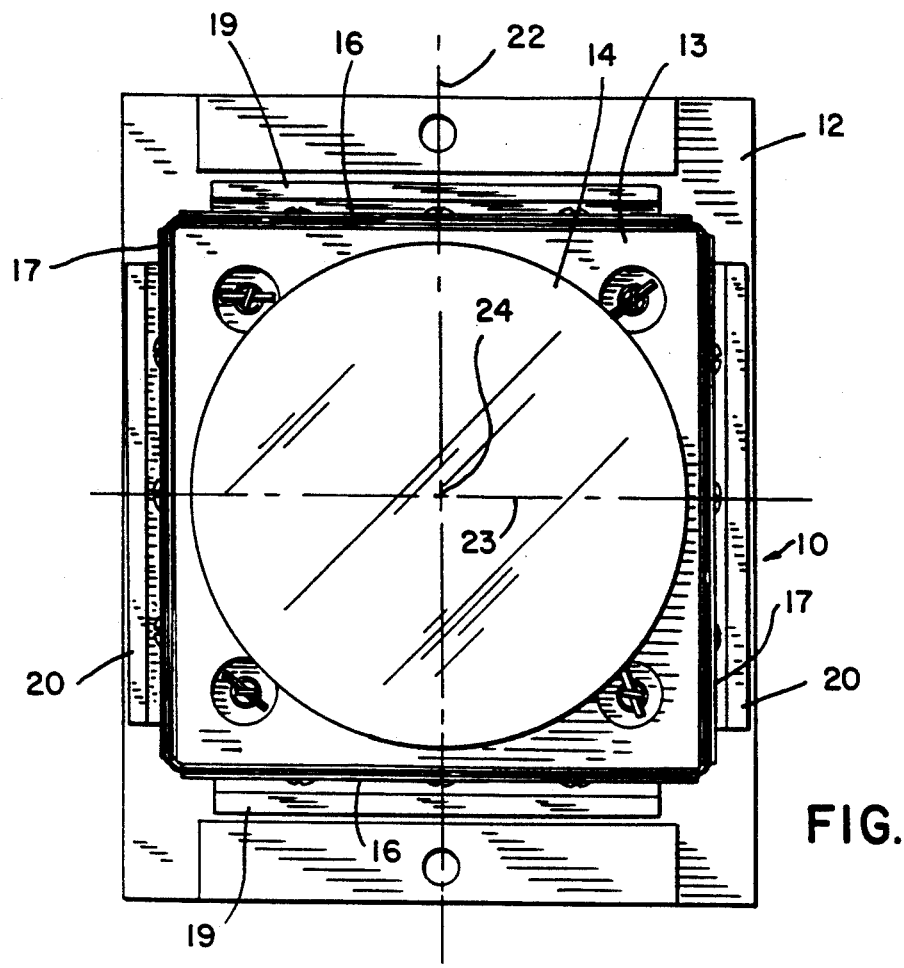
FIG. 1 is a top plan view of a dynamic mirror alignment device in accordance with the present invention.

With reference to the drawings, the dynamic mirror alignment device of the present invention is shown generally at 10 in FIG. 1 in top plan view, and is illustratively shown having a base 12 to which is mounted a mirror support 13. The fixed mirror 14 of the interferometer is mounted onto the mirror support 13 as described further below. It is understood that the fixed mirror 14 may be any of the various forms employed typically in infrared spectrometers, and, in appropriate cases, the construction of the mirror support may be incorporated directly into the mirror 14 so that they form an integral unit. Front and back coil supports 16 are mounted to the front and back edges of the mirror support 13, which is preferably formed as a substantially square plate of a non-ferromagnetic material such as aluminium, and side coil supports 17 are mounted to the sides of the mirror support 13 and aligned orthogonal to the coil supports 16. As explained further below, the coil supports 16 are aligned with permanent magnets 19 mounted on the base 12, and the side magnets supports 17 are aligned with permanent magnets 20 mounted on the base 12.

The mirror alignment device of the present invention allows dynamic reorientation of the mirror 14 in two degrees of freedom—rotation about two orthogonal axes 22 and 23 which preferably bisect the mirror 14 in each direction so that the mirror is symmetrical about these axes and so that the axes intersect at a point 24 at the center of the mirror. The axis 22 may be denoted the roll axis and the axis 23 may be denoted the pitch axis. Preferably, the two axes 22 and 23 line in the same plane, which may be but does not necessarily have to be within the mirror 14. For example, the plane defined by the lines 22 and 23 may lie below the mirror and pass through the mirror support 13 without affecting the operation of the mirror alignment device. As generally shown in the perspective view of FIG. 2, in which the mirror 14 is removed from the device for purposes of clarifying the illustration, the coil supports 16 extend down into slots 25 formed in the magnets 19, and the bottom portions of the coil supports 17 extend down into slots 26 formed in the magnets 20.

Figure 3:
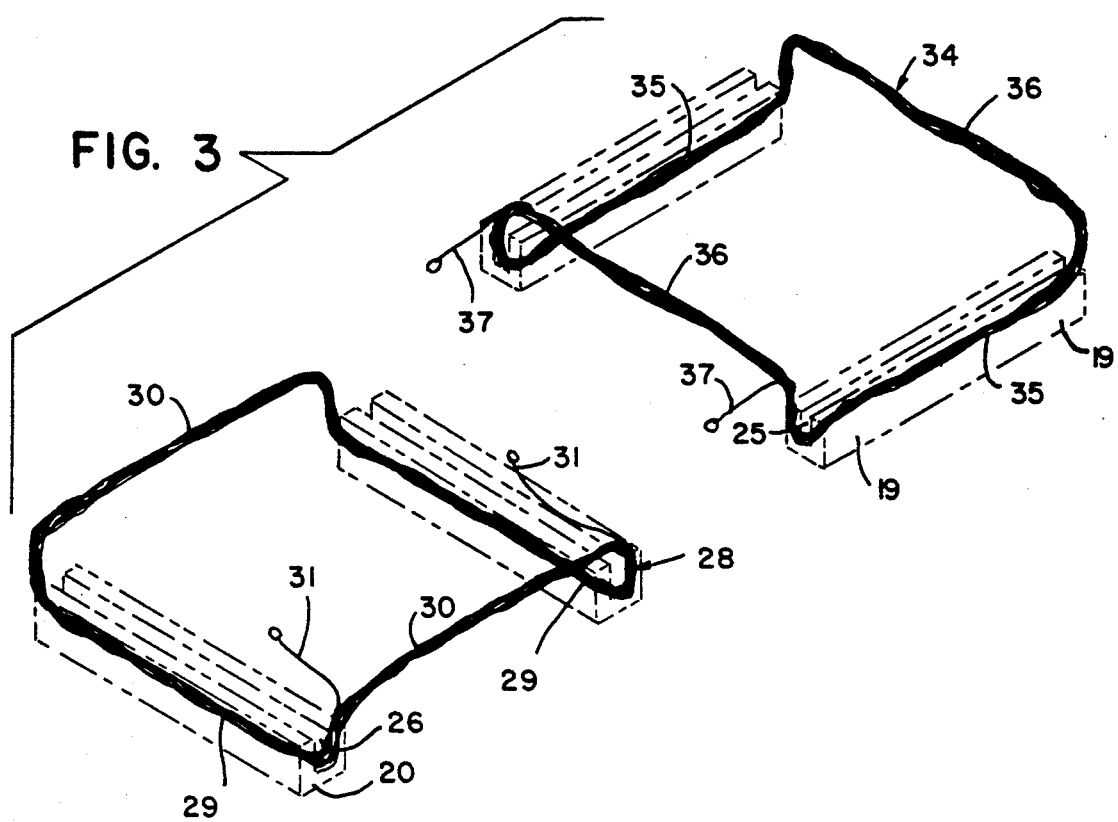
FIG. 3 is an illustrative view of the two drive coils of the mirror alignment device spaced from each other to better illustrate their relative construction and alignment.

The driving force for rotating the mirror support 13 and the magnet 14 about the axes of rotation is provided by two orthogonal driving coils 28 and 34, both preferably formed of multiple turns of wire conductor, which extend around the periphery of the mirror support 13 within the coil supports 16 and 17. The form of the preferred driving coils 28 and 34 is best shown in FIG. 3 which illustrates the two coils separated from one another and from the surrounding support structure to better show the shape of the coils. The driving coil 28 is formed in a substantially saddle shape having two straight lower coil sections 29 and, orthogonal thereto, to upper coil sections 30, with terminal wires 31 leading from the coil for connection to a power supply (not shown) which provides driving current to the coils. The lower coil portions 29 extend down into the slots 26 of the magnets 20, being shown in dash lines in FIG. 3 to illustrate the relationship between the coil 28 and magnet 20. The lower portions 29 of the coil 28 are held within the coil support 17, while the upper sections 30 of the coil 28 are held within the coil supports 16. The coil 34 is formed similarly to the coil 28, although oriented orthogonally thereto, having straight lower coil sections 35, upper coil sections 36 and terminal wires 37. The lower sections 35 of the coil 34 extend into the slots 25 of the magnets 19, with the magnets 19 being shown in dashed lines in FIG. 3 for illustrative purposes. The lower sections 35 of the coil 34 are supported by the coil support 16 whereas the upper sections 36 of the coil 34 are supported by the orthogonally oriented coil support 17. The straight coil sections 27 are thus substantially perpendicular to the straight coil sections 35. Drive current is provided to the coil 34 via the terminal wires 37 from an adjustable current source (not shown) which may be of any well known type of modulable power supply that can provide drive current to the coils.

Figure 2:
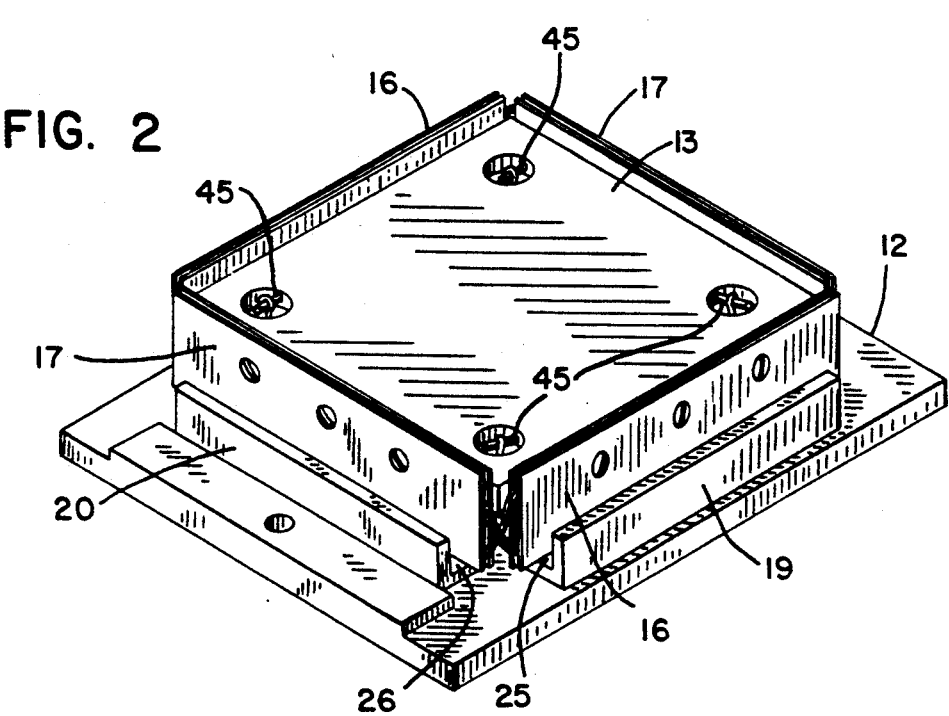
FIG. 2 is a perspective view of the dynamic mirror alignment device of FIG. 1 with the mirror removed to better illustrate the mounting structure.

The operation of the drive coils can be illustrated with respect to the views of FIGS. 2 and 3. The permanent magnets 20 are formed so that the north and south poles of these magnets face each other across the slot 26 so that magnetic lines of flux extend substantially directly across the slot. Consequently, when current is applied to the terminals 31 of the coil 28 in one direction, the current flowing through one of the lower sections 29 of the coil 28 will interact with the magnetic field in the slot 26 to provide an upward drive force on that portion of the coil in accordance with the relation $F = I \times B$, where F is the force vector acting on the wires of the coil, I is the current vector, B is the magnetic field vector and x represents the cross product. The (e.g., upward) force on the coil section is transmitted to the mirror support 13. The current flowing in the opposite direction in the other lower section 29 will interact with the magnetic flux in the slot 26 in the magnet 20 (which is oriented in the same direction as the opposite magnet 20) to produce a force on the coil section which is the opposite direction from the force on the first coil section. Thus, a torque will be applied to the mirror support 13 which will tend to rotate the mirror support and about the roll axis 22. Changing the direction of current flowing into the terminals 31 will result in a torque being applied to rotate the magnet support 13 and magnet 14 in the opposite direction about the axis 22. Similarly, current applied to the terminals 37 of the coil 34 will cause interaction of the current flowing in the lower sections 35 of the coil with the magnetic flux within the slots 25 of the magnets 19 to apply a torque to the mirror support 13 to tend to rotate the mirror support and mirror in one direction or the other about the pitch axis 23, depending on the direction of current flow through the coil.

The current carrying wires of each lower section of the coils 28 and 39 preferably are straight and parallel to the appropriate one of the axes 22 or 23, and the magnetic field through the straight lower sections of each coil is preferably parallel to the other axis and thus perpendicular to the wires of the coil section through which the field passes. It is seen that if the field is perpendicular to the wires of the lower coil section and parallel to the non-rotating axis (and thus parallel to the wires of the lower or active coil section of the other coil), a current through the coil will result in a torque only about the desired axis of rotation and not about the other axis.

The upper or return sections 30 (of the coil 28) and 36 (of the coil 19) are above the magnets 19 and 20, respectively, and have substantially no flux passing therethrough from the magnets 19 and 20 since most of the flux from these magnets is confined to the slots in the magnets. Thus, a current flowing in the coil 28 will impose substantially no or very little torque about the pitch axis 23 and current flowing in the coil 34 will apply substantially no torque about the roll axis 22.

Figure 4:
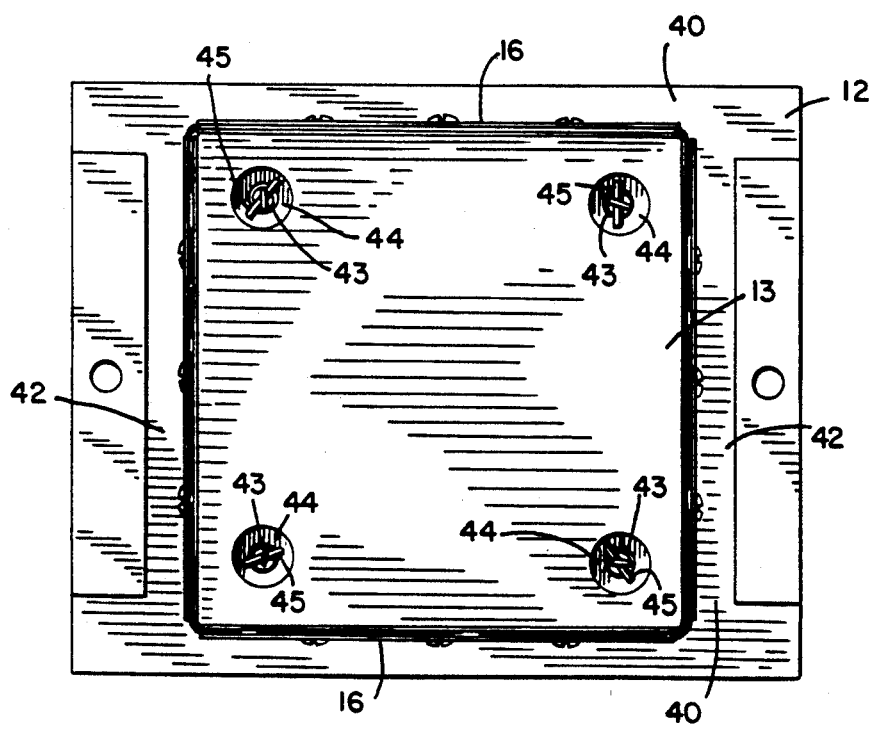
FIG. 4 is a top plan view of the mirror alignment device with the mirror and permanent magnets removed.
Figure 5:
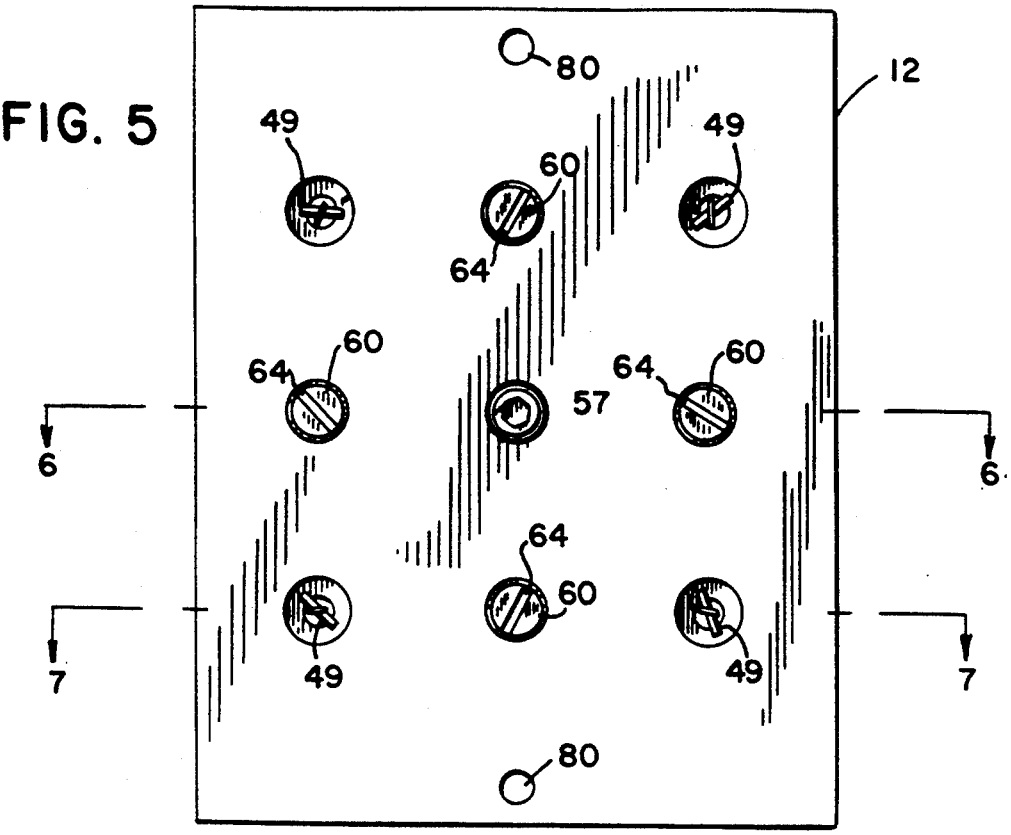
FIG. 5 is a bottom plan view of the dynamic mirror alignment device of the invention.

Further details of the various parts of the device 10 are illustrated in the views of FIGS. 4–7. FIG. 4 is a top view of the device essentially as shown in FIG. 2 in which the mirror 14 and the magnets 19 and 20 have been removed. The top surface of the base 12, which is preferably formed of a non-ferromagnetic material, such as aluminum, is milled down in portions 40 where the magnets 19 will be mounted. Slots 42 are milled in the top surface of the base 12 to accommodate the magnets 20. Holes 43 are formed at four peripheral portions of the mirror support 13 near the corners and have a bevelled indentation about their top openings. Clips 45 are held within the bevelled portions 44 and connect to tension springs 46 which, as shown in the cross-sectional view of FIG. 7, extend downwardly through holes 48 in the base 12 to connecting clips 49 at the bottom of the base 12.

Figure 6:
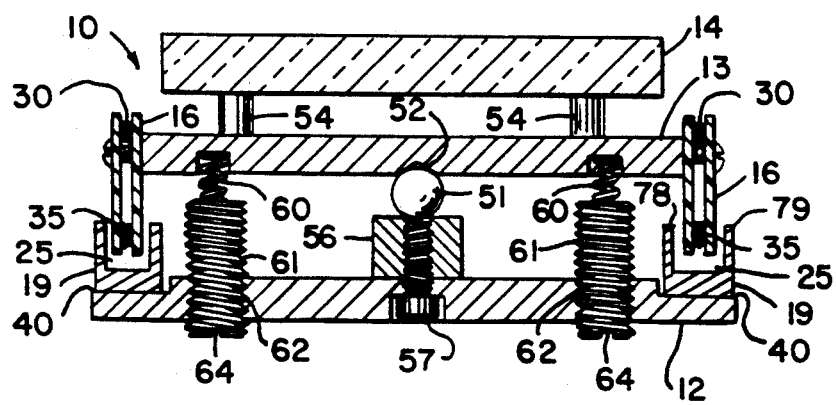
FIG. 6 is a cross-sectional view through the device of the invention taken generally along lines 6—6 of FIG. 5.

As best illustrated in the cross-sectional view of FIG. 6, the mirror support 13 is preferably mounted for pivoting about the axes 22 and 23 on a central pivot mount composed of a bearing ball 51 which is received in a central pivot pocket 52 on the underside of the mirror support plate 13. The pivot pocket 52 may be formed as a substantially conical depression in the bottom of the mirror support. As also illustrated in FIG. 6, the mirror 14 is mounted to the top surface of the mirror support 13 by connectors 54. The bearing ball 51 is supported in a desired position by a mounting post 56 which is threadingly engaged by a set screw 57 which is screwed into a hole in the base 12. The tension springs 46 tend to resiliently restore the mirror support 13 to an initial position if it is displaced rotationally from that initial position about the bearing ball pivot 51.

To allow adjustment of the initial or "home" position of the mirror support, four compression springs 60 are mounted between the back surface of the mirror support 13 and threaded studs 61 which thread through threaded opening 62 in the base 12. The four compression springs 60 are oriented at four corners around the central balls 51 to allow the pressure applied by these springs to be adjusted so that the mirror support and mirror are displaced about either of the two axes 22 or 23 to a desired position. Each of the studs 61 has a slot 64 formed in its bottom surface to allow a screw driver to be used to adjust the position of the studs.

Figure 7:
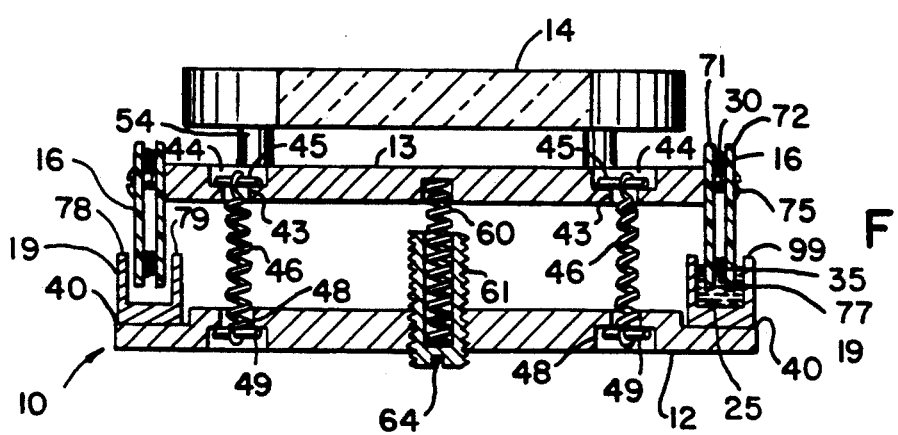
FIG. 7 is a cross-sectional view of the device of the invention taken generally along lines 7—7 of FIG. 5.

As is best shown in the cross-sectional view of FIG. 7, each of the coil supports 16 (and each of the coil supports 17, which are formed identically thereto) may include an inner plate 71 and an outer plate 72 which are connected together and to the edge of the mirror support 13 by spacer studs 75 which also hold plates apart by a desired spacing. The plates 71 and 72 may be formed of a suitable plastic, e.g., polystyrene. In the space between the plates 71 and 72 above the stud 75, the wires of the upper coil section 30 of the coil 28 are wound. In the space between the plates 71 and 72 beneath the spacer stud 75, the wires of the lower coil section 35 of the coil 34 are wound. The lower section 35 between the plates 71 and 72 extends into the slot 25 between the poles of the magnet 19 A ferromagnetic fluid 77 may be held within the slot 25. The fluid 77 may serve the dual purposes of restraining the magnetic lines of flux between the two pole portions 78 and 79 of the magnet 19, and providing fluid damping of the motion of the mirror since the fluid 77 will tend to slow vibrational movement of the coil support 16 in contact with the fluid. The coil support 17 and the coil sections 29 and 36 which are held within them, are formed in identically the same manner as described above for the coil supports 16, and similar damping fluid may be used in the slots 26 of the permanent magnets 20.

The dynamic mirror alignment mechanism of the present invention is mounted in place in an interferometer and adjusted in the following manner. First, the base is affixed to a portion of the mounting frame of the interferometer (not shown), such as by firmly securing the base 12 of the device 10 to the frame by passing bolts through the mounting holes 80 formed at the ends of the base. The relative rotational position of the face of the mirror 14, defining the initial or home position of the mirror with respect to the axes of rotation 22 and 23, is adjusted by the operator by turning the compression spring studs 64 one way or the other, to turn them in or out with respect to the base, until the desired home position of the mirror is obtained. Current drive amplifiers are then connected to the coils 28 and 34 to provide current to the terminal wires 31 and 37 in the proper direction to drive the mirror in rotation about one or both of the axes 22 or 23. The precise control of the positioning of the mirror utilizing feedback information obtained optically may be done in any desired manner to provide the feedback signals which control the current into the coils 28 and 34.

The mirror support 13 is preferably formed of a non-ferromagnetic material such as aluminum. The magnets may be formed of various permanent magnet materials, preferably a high energy product magnet such as neodymium iron boride (NdFeB), and the magnet can be formed in a U-shape as shown, or of two separated plates of magnets forming the two legs of the "U" with a spacer in between the legs at the bottom, with the top and bottom of each of the two legs forming north or south poles and with the north and south poles opposed to one another. Alternatively, the magnets may be formed of wound wire coils, with or without ferromagnetic pole pieces, to provide the magnetic field into which the lower coil sections 29 and 35 extend. The coil supports 16 and 17 may be formed integrally with the coils, for example, by forming the coils on an amature and embedding the coils in a hardenably epoxy to form the coil supports which may then be attached to the mirror support 13. The main qualification for the magnets 19 and 20 is that they be constructed so that they apply magnetic flux to the lower sections 29 and 35 of the coils 28 and 34, respectively, in the proper direction, and not to the upper portions 30 and 36, respectively, of these coils.

Figure 8:
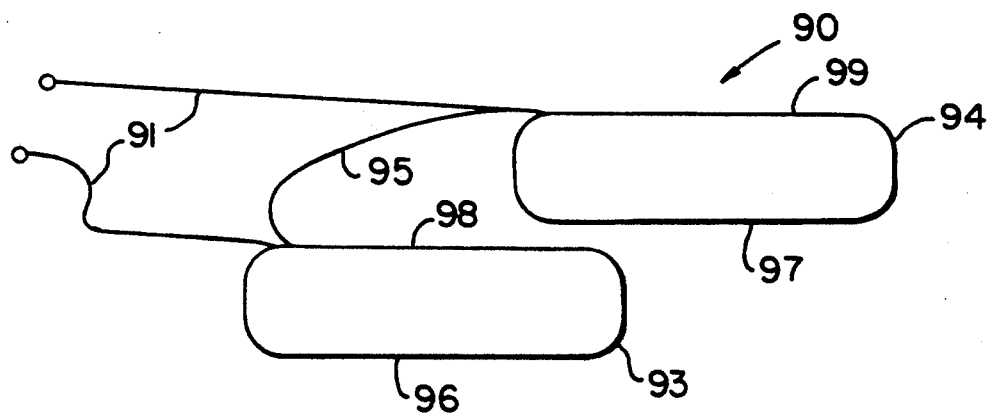
FIG. 8 is an illustrative view of an alternative drive coil for the mirror alignment device.

An alternative form for the coils 28 and 34 is shown at 90 in FIG. 8. The coil 90 is supplied with current through terminal wires 91 and has two individual coil sections 93 and 94 with a connecting line 95 joining them. The coils 93 and 94 are wound of multiple turns of wire around, for example, the coils supports 16 and 17. The coils 93 and 94 have straight lower sections 96 and 97 which extend into the slots of the magnets 19 or 20, and straight upper sections 98 and 99 which are outside of the field of the magnets 19 and 20. The connector 95 carries current from one of the coils to the other. The coils 90 function in the same manner as the coils 28 and 34 described above.

It should be understood that the position of the coils 28 and 34 and the magnets 19 and 20 may be interchanged in the present invention. That is, the magnets 19 and 20 may be mounted on the mirror support 13, and the coil supports 16 and 17 and the coils 28 and 34 may be mounted to the base 12. Otherwise, the device will operate in the same manner as described above.

Although specific constructions and embodiments of the present invention have been shown and described for illustrative purposes, it is understood that the invention is not so limited, and that it encompasses all modified forms thereof as come within the scope of the following claims.

What is claimed is:

1. A dynamic mirror alignment device for the interferometer of a spectrometer comprising:
   (a) a base;
   (b) a mirror support to which an interferometer mirror may be mounted;
   (c) means for mounting the mirror support to the base to allow resilient pivoting of the mirror support about an initial position in two orthogonal axes when torque is applied to the mirror support;
   (d) two drive coils mounted to the periphery of one of the base or the mirror support and each coil having four quardrants, each coil having straight coil sections along two opposite quadrants which are at a lower position with respect to the other of the mirror support or base, and coil sections which are at a higher position, the two drive coils mounted so that the straight lower sections of each occupy an adjacent quadrant;
   (e) means on the other of the mirror support or base for applying a magnetic field through each of the lower sections of the coils to intersect the lower coil sections in a direction preferably substantially parallel to the axes about which the mirror support pivots, whereby the mirror support will tend to tilt about one axis in one direction when current is supplied to one coil in one direction and about the same axis in the other direction when current is supplied in the opposite direction through that coil, and similarly whereby current supplied in one direction through the other drive coil will tend to tilt the mirror support about the other orthogonal axis in one direction and will tend to tilt the mirror support in the opposite direction when current is supplied to the drive coil in the opposite direction.

2. The device of claim 1 wherein the means for mounting includes a pivot mount on the base comprising a bearing ball which is received in a central pivot pocket on the mirror support.

3. The device of claim 2 wherein the means for mounting further includes tension springs attached to the mirror support and the base at spaced positions around the pivot mount to draw the mirror support toward the base and hold the mirror support on the bearing ball.

4. The device of claim 3 further including compression springs mounted between the base and the mirror support at spaced positions about the pivot mount and means for adjusting the compression of the springs to allow adjustment of the initial position of the mirror support about the orthogonal axes about which the mirror support is rotatable on the bearing ball.

5. The device of claim 1 wherein the mirror support is formed as a substantially flat plate of substantially square periphery, and wherein the coils are mounted to the periphery of the mirror support plate.

6. The device of claim 1 wherein the means for providing a magnetic field comprise four permanent magnets each having a generally U-shape with a central slot therein, the legs of the U forming north and south poles of the permanent magnets such that the magnetic lines of flux run across the slot of each permanent magnet, and wherein the permanent magnets are mounted orthogonally to each other beneath the lower sections of the drive coils such that one of the lower sections of each drive coil is in the slot of a permanent magnet.

7. The device of claim 6 wherein the drive coils are mounted to the mirror support plate such that along each edge of the mirror support plate one of the drive coils has its lower section in the slot of the permanent magnet to be affected by the magnetic field thereof, while the upper section of the other drive coil along each such edge is mounted to the mirror support plate above the permanent magnets so as not to be substantially affected by the magnetic field of the permanent magnet.

8. The device of claim 6 further including a ferromagnetic damping fluid in the slot of at least one of the permanent magnets and in contact with the coil section therein to provide damping of the movement of the coil section and thereby of the mirror support.

9. The device of claim 1 further including an interferometer mirror mounted to the mirror support.

10. The device of claim 6 including coil supports attached to each of the four sides of the mirror support, each coil support formed of an inner plate and an outer plate connected together by spacer studs which hold the plates apart by a desired spacing, and wherein the upper coil section of each of the coils is supported between the plates above the studs and the lower coil sections are supported between the plates below the spacer studs.

11. The device of claim 1 wherein the coil sections of the two drive coils which are at a higher position are, in each drive coil, in opposite quadrants from the coil sections of each coil which are in a lower position.

12. A dynamic mirror alignment device for the interferometer of a spectrometer comprising:
 (a) a base;
 (b) a mirror support to which an interferometer mirror may be mounted;
 (c) means for mounting the mirror support to the base to allow resilient pivoting of the mirror support about an initial position in two orthogonal axes when torque is applied to the mirror support;
 (d) two drive coils mounted to the periphery of the mirror support and each coil having four quadrants, each coil having straight coil sections along two opposite quadrants which are at a lower position with respect to the base, and coil sections along the opposite quadrants which are at a higher position, the two drive coils mounted so that the straight lower sections of each occupy an adjacent quadrant;
 (e) four permanent magnets each having a generally U-shape with a central slot therein, the legs of the U forming north and south poles of the permanent magnets such that the magnetic lines of flux run across the slot of each permanent magnet, and wherein the permanent magnets are mounted orthongonally to each other beneath the lower sections of the drive coils such that one of the lower sections of each drive coil is in the slot of a permanent magnet whereby the mirror support will tend to tilt about one axis in one direction when current is supplied to one coil in one direction and about the same axis in the other direction when current is supplied in the opposite direction through that coil, and similarly whereby current supplied in one direction through the other drive coil will tend to tilt the mirror support about the other orthogonal axis in one direction and will tend to tilt the mirror support in the opposite direction when current is supplied to the drive coil in the opposite direction.

13. The device of claim 12 wherein the means for mounting includes a pivot mount on the base comprising a bearing ball which is received in a central pivot pocket on the mirror support.

14. The device of claim 13 wherein the means for mounting further includes tension springs attached to the mirror support and the base at spaced positions around the pivot mount to draw the mirror support toward the base and hold the mirror support on the bearing ball.

15. The device of claim 14 further including compression springs mounted between the base and the mirror support at spaced positions about the pivot mount and means for adjusting the compression of the springs to allow adjustment of the initial position of the mirror support about the orthogonal axes about which the mirror support is rotatable on the bearing ball.

16. The device of claim 12 wherein the mirror support is formed as a substantially flat plate of substantially square periphery, and wherein the coils are mounted to the periphery of the mirror support plate.

17. The device of claim 12 wherein the drive coils are mounted to the mirror support plate such that along each edge of the mirror support plate one of the drive coils has its lower section in the slot of the permanent magnet to be affected by the magnetic field thereof, while the upper section of the other drive coil along each such edge is mounted to the mirror support plate above the permanent magnets so as not to be substantially affected by the magnetic field of the permanent magnet.

18. The device of claim 12 further including a ferromagnetic damping fluid in the slot of at least one of the permanent magnets and in contact with the coil section therein to provide damping of the movement of the coil section and thereby of the mirror support.

19. The device of claim 12 further including an interferometer mirror mounted to the mirror support.

20. The device of claim 12 including coil supports attached to each of the four sides of the mirror support, each coil support formed of an inner plate and an outer plate connected together by spacer studs which hold the plates apart by a desired spacing, and wherein the upper coil section of each of the coils is supported between the plates above the studs and the lower coil sections are supported between the plates below the spacer studs.

* * * * *